United States Patent [19]

Beecher et al.

[11] Patent Number: 5,452,916
[45] Date of Patent: Sep. 26, 1995

[54] ENERGY ABSORBING DEVICE FOR STEERING COLUMN

[75] Inventors: Gregory A. Beecher, Madison Heights; Dennis F. Stedman, Ortonville; Sukhbir S. Bilkhu, Rochester Hills; Mark W. Crossman, Birmingham; Stephen P. Gierak, Rochester Hills, all of Mich.

[73] Assignee: Chrysler Corporation, Highland Park, Mich.

[21] Appl. No.: 278,350

[22] Filed: Jul. 21, 1994

[51] Int. Cl.⁶ .................................................. B62D 1/11
[52] U.S. Cl. ............................................... 280/777; 74/492
[58] Field of Search ........................ 280/777, 775; 74/492, 493

[56] References Cited

U.S. PATENT DOCUMENTS 3,785,671  1/1974  Salewsky ........................ 280/777
3,803,938  4/1974  Bratke et al. ..................... 74/492
4,773,674  9/1988  Wierschem ..................... 280/777
5,026,092  6/1991  Abramczyk ..................... 280/777

*Primary Examiner*—Karin L. Tyson
*Assistant Examiner*—Paul N. Dickson
*Attorney, Agent, or Firm*—Edward A. Craig

[57] ABSTRACT

An energy absorbing device for materially reducing steering column motion resulting from passenger compartment intrusion in an automotive vehicle when the powertrain impacts rearward vehicle portions in a frontal collision. The energy absorbing device comprises a bracket in the form of a generally box-shaped frame having side panels and a top panel. The side panels and top panel have openings defining upper and lower struts. The struts are made of a relatively stiff, bendable, flexible material capable of controlled deformation when the powertrain impacts-the rearward vehicle portions in a frontal collision.

4 Claims, 5 Drawing Sheets

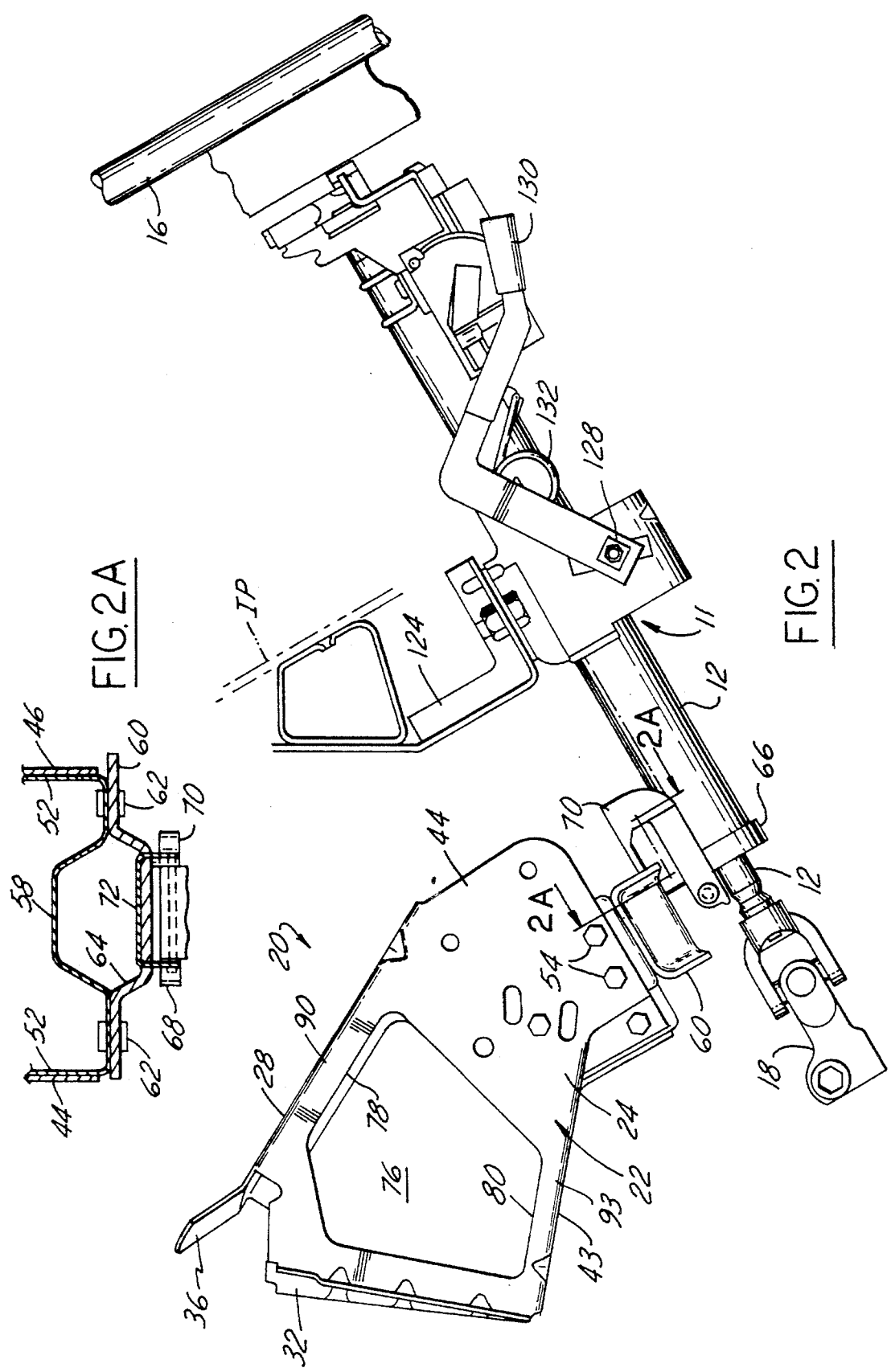

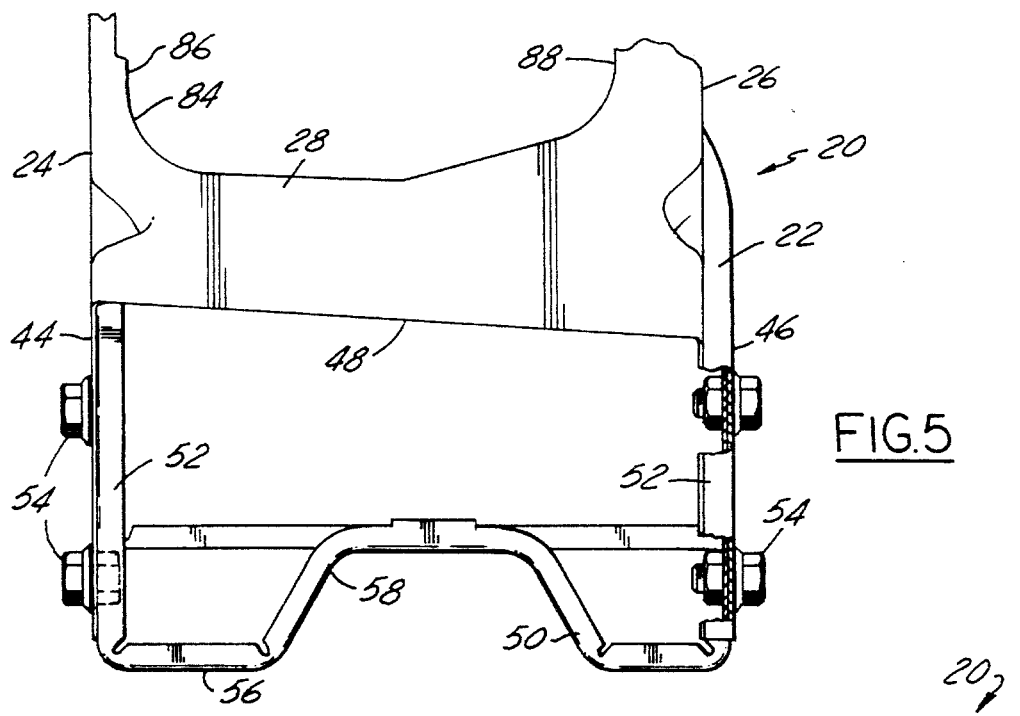
FIG.5
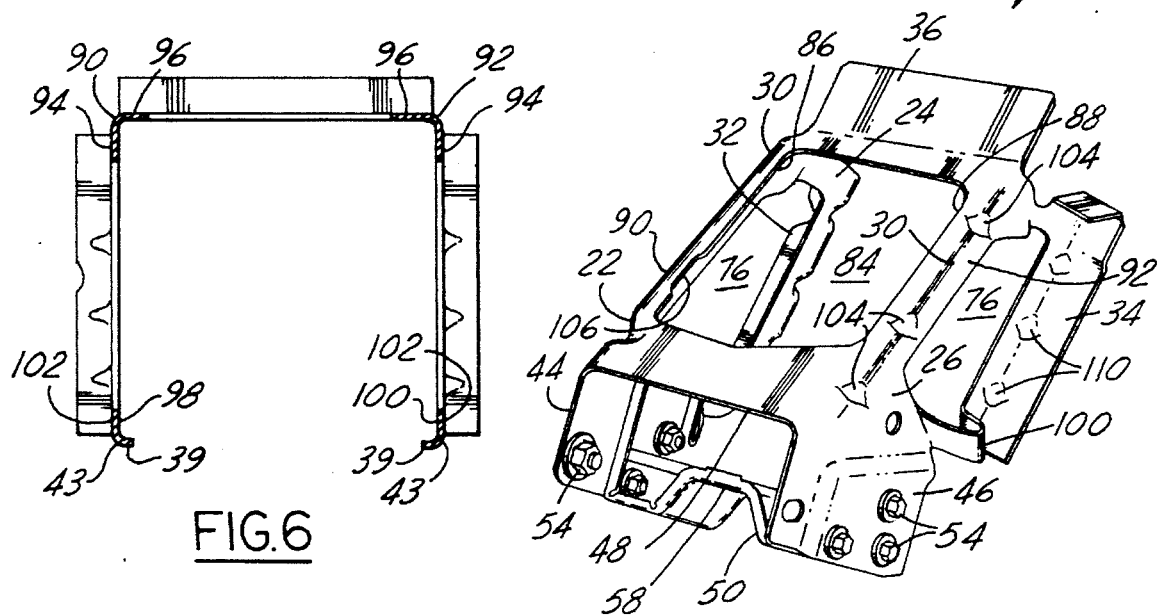
FIG.6
FIG.7

ENERGY ABSORBING DEVICE FOR STEERING COLUMN

FIELD OF THE INVENTION

This invention relates generally to energy absorbing devices and refers more particularly to an energy absorbing device for materially reducing the affect of the powertrain on the occupant compartment intrusion related steering column motion, and the driver against the vehicle structure in an automotive vehicle when the powertrain impacts rearward vehicle portions in a frontal collision.

BACKGROUND AND SUMMARY OF THE INVENTION

When a frontal collision or crash occurs, two things happen, depending on the severity of the crash, namely, (1) the driver moves forwardly against the steering wheel, and (2) the powertrain impacts rearward vehicle portions.

When the driver moves forwardly, the steering wheel is normally at an angle such that his chest will strike the steering wheel. In many late model vehicles, the steering wheel is equipped with an air bag which deploys upon impact and cushions the reaction force of the driver's chest against the steering wheel. However, as the powertrain impacts rearward vehicle portions, it may contact the steering column intermediate shaft and rotate the steering column to a greater angle so that the air bag does not deploy against the driver's chest, as intended, but rather higher up and at an undesirable angle. At this greater angle, the steering wheel and air bag do not provide the driver with the same level of safety protection.

What is needed is a device to absorb the energy of the powertrain and occupant rearward vehicle portions so that the angle of the steering column will not be influenced.

More specifically, the energy absorbing device of this invention comprises a bracket in the form of a generally box-shaped frame formed with openings in the side panels and in a transverse panel which extends between the side panels. These openings define elongated upper and lower struts. The bracket is positioned above the steering column and has the front end portion secured to the vehicle support structure and a rear end portion operatively connected to the steering column. The bracket is adequately stiff to support the steering column, yet bendable, such that it is capable of controllable deformation when the powertrain contacts the rearward vehicle portions in a frontal collision. In this way, the force of the powertrain and occupant is gradually dissipated in a controlled manner so that the angle of the steering column is not materially changed, and the intended air bag performance is preserved.

Preferably, one or more of the struts is formed with flex points which initiate controllable deformation under the impact of the rearward vehicle portions with the powertrain. Preferably, the lower struts have less resistance to deformation than the upper struts and therefore deform more readily than the upper struts. In a more severe crash, both the upper and lower struts will deform and thus gradually absorb energy.

Preferably, the energy absorbing device includes a second bracket for securing the steering column to the first bracket. Fasteners form a releasable connection between the two brackets, so that the second bracket can be removed, permitting better access to the first bracket which can then be secured to the vehicle support structure without interference from the second bracket.

One object of this invention is to provide an energy absorbing device having the foregoing features.

Another object is to provide an energy absorbing device which is composed of a relatively few simple parts, can be easily and inexpensively manufactured, and is highly effective in controlling the rotational and longitudinal movement of the steering column in a collision.

Other objects, features, and advantages of this invention will become more apparent from the following description and claims, especially when considered with the accompanying drawings.

BRIEF DESCRIPTION OF THE DRAWINGS

FIG. 2 is a side elevational view of the steering column and energy absorbing device attached thereto.

FIG. 2A is a view taken on the line 2A—2A in FIG. 2.

FIG. 5 is a partial view of FIG. 4 taken in the direction towards the front of the vehicle.

FIG. 6 is a sectional view taken on the line 6—6 in FIG. 4.

FIG. 7 is a perspective view of the energy absorbing device, and is similar to FIG. 4 except that in FIG. 7 the lower struts only of the device are shown collapsed as the result of a frontal collision of moderate severity.

DETAILED DESCRIPTION

Figure 9:
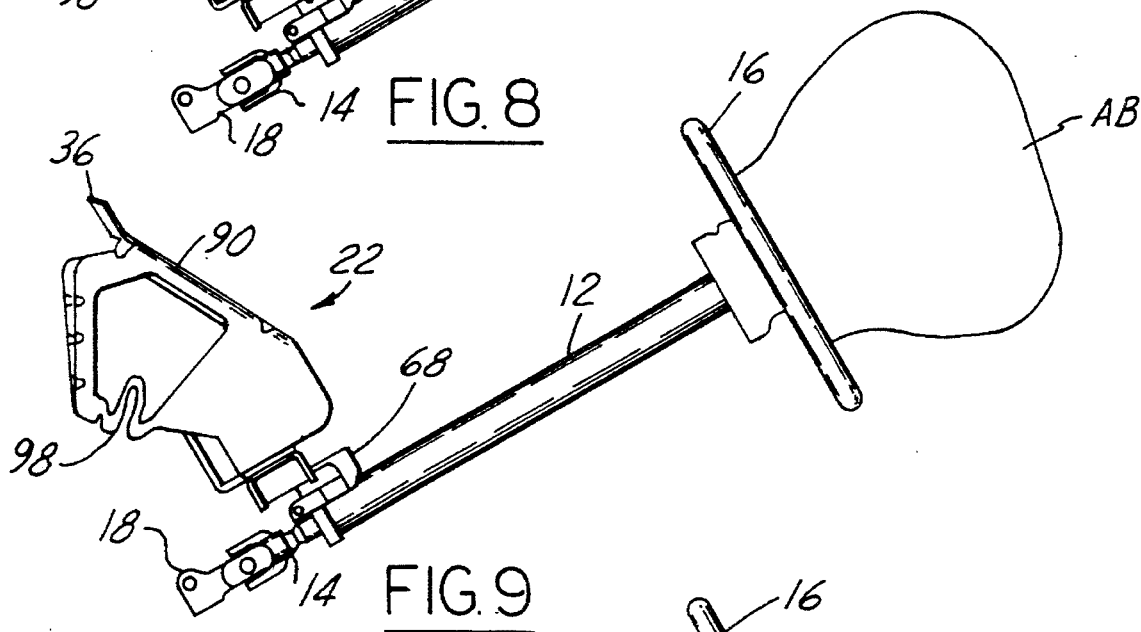
Figure 10:
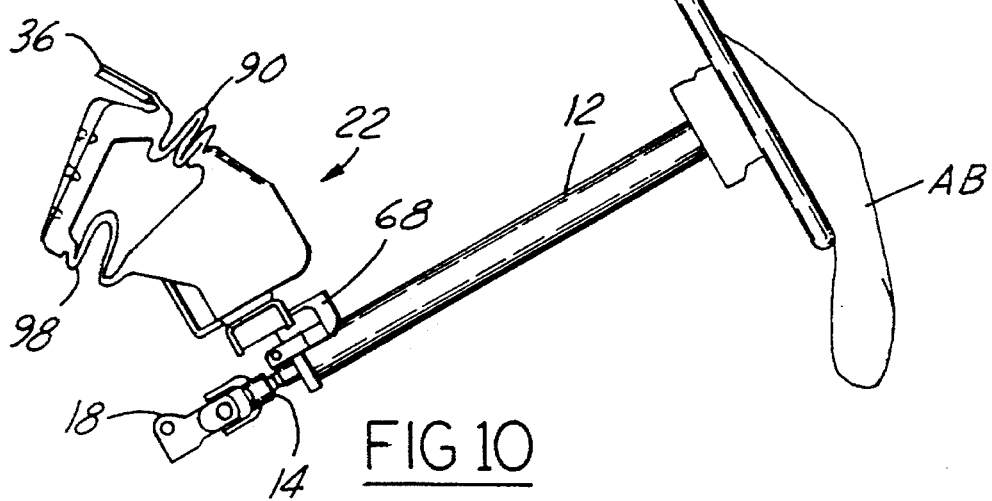

Referring now more particularly to the drawings, the steering column assembly 11 will be seen as having a tubular steering column 12. A steering shaft 14 extends through the tubular steering column 12 and has a steering wheel 16 at the upper end and a shaft coupler 18 at the lower end. The shaft coupler is operatively connected to a steering gear assembly (not shown) to steer the front wheels of the vehicle. The steering column 12 normally extends in a fore and aft direction or lengthwise relative to the vehicle at an upward and rearward inclination. An air bag, not shown except diagrammatically at AB in FIGS. 9 and 10, is contained within the steering wheel, concealed by a closure 19 which separates upon impact in a frontal collision, allowing the air bag to deploy.

Above and near the lower end of the steering column 12 and concealed by the instrument panel IP, is an energy absorbing device 20 comprising a bracket 22 in the form of a box-like frame, which is preferably a stamping of one-piece construction made of relatively stiff, bendable, flexible sheet metal. The bracket 22 has laterally spaced apart, generally vertical and parallel side panels 24 and 26 in planes parallel to the steering column, and a transverse or top panel 28. The transverse panel 28 extends across the top of the bracket and its side edges are integrally joined to the upper edges of the side panels such that the top and side panel surfaces are at right angles thereto along the radii 30.

Mounting flanges 32 and 34 extend laterally outwardly from the front edges of the side panels 24 and 26. A mounting flange 36 extends upwardly and forwardly from the front edge of the transverse panel 28. The flanges 32 and 34 are preferably welded or otherwise permanently secured to an upright portion 38 of the dash panel 40. The flange 36 is preferably welded or otherwise permanently secured to the cross member 42 of the dash panel. Flanges 39 extend laterally inwardly from the bottom edges 43 of the side panels. The bracket 22 is entirely open at the front between mounting flanges 32 and 34 and at the bottom between flanges 39.

The side panels have laterally spaced, parallel extensions 44 and 46 which extend rearwardly and downwardly from the rear edge 48 of the transverse panel 28. A generally U-shaped mounting bracket 50 extends between the side panel extensions 44 and 46. The upturned side flanges 52 of the mounting bracket 50 are removably secured to the inner surfaces of the extensions 44 and 46 by fasteners 54. The cross piece 56 of the mounting bracket 50 between the side flanges 52 has an elevated central portion 58. A second mounting bracket 60 extends across the bottom of mounting bracket 50 and is removably secured to the bracket 50 by fasteners 62. The second mounting bracket 60 has a depressed central portion 64. Bracket 50 is bolted to bracket 22 and to the bracket 60 so that bracket 50 may be removed to facilitate welding bracket 22 to the dash panel.

The steering column 12 has a fixed collar 66 on the front end. Flexible straps 68 and 70 each have one end pivoted to the collar 66 on the steering column 12 and the other end rigidly secured to a plate 72 secured to the depressed portion 64 of bracket 60. The straps 68 and 70 are formed of a relatively stiff, bendable, flexible material and in the event of a frontal collision will allow the steering column to gradually move longitudinally, absorbing some of the reaction force when the driver's chest contacts the steering column. These straps are the subject matter of another application which is assigned to the assignee of this application.

Referring again to bracket 22, each of the side panels 24 and 26 is formed with a large central opening 76. The upper margin 78 of the opening 76 in each side panel extends in spaced parallel relation to the junction 30 between the side panel and the transverse panel 28. The bottom margin 80 of the opening 76 extends in spaced parallel relation to the bottom edge 43 of each of the side panels.

The top or transverse panel 28 has an enlarged central opening 84. The side margins 86 and 88 of the opening 84 extend in spaced parallel relation to the junctions 30 between the transverse panel and the side panels.

The material between the upper margins 78 of the openings 76 in the side panels and the side margins 86, 88 of the opening 84 in the top panel define the elongated upper struts 90 and 92. These upper struts are in laterally spaced, parallel relation to one another, each being L-shaped in cross-section consisting of a flange 94 in the side panel and a flange 96 in the transverse panel which are integrally connected in a 90 degree angle.

The material between the bottom margins 80 of the openings 76 in the side panels define the elongated lower struts 98 and 100. The lower struts are in laterally spaced, parallel relation to one another. Each lower strut is L-shaped in cross-section consisting of a flange 102 in the side panel and the flange 39 along the lower edge of the side panel. Flanges 102 and 39 form a 90 degree angle.

The struts 90, 92, 98 and 100 are integral parts of the bracket and of a relatively stiff, bendable, flexible material.

The two lower struts 98 and 100 are dented or crimped to provide what are sometimes referred to as darts 104, providing points of weakness or flex points. These dents or darts 104 extend into the strut flanges 102 and 39 across the lower edges 43 of the side panels. Similar dents or darts 104 are provided in the upper strut 92, such darts extending into the strut flanges 94 and 96 across the junction between the side panel 26 and transverse panel 28. A notch 106 is formed in the flange 96 of the upper strut 90, which tends to somewhat weaken the strut and thus provide a flex point. Similar dents or darts are formed in the bracket forwardly of the upper struts, which extend into the material of the side and transverse panels across the junction therebetween.

In the event of a frontal collision resulting in an impact sufficient to cause powertrain intrusion into the occupant compartment, the dash panel will place bracket 22 in compression. The struts are designed to deform and collapse gradually and thus protect the steering column from being tilted upwardly by the force of the engine and dash panel against the steering column intermediate shaft. The dents 104 and notch 106 provide flex points where deformation commences.

The lower struts 98 and 100 are designed and constructed to have less resistance to deformation and collapse than the upper struts 90 and 92. This feature is due at least in part to the fact that the combined width of the flanges 102 and 39 of each lower strut is less than the combined width of the flanges 94 and 96 of each upper strut. Hence, in a front end collision, the lower struts will collapse first. If the collision is of only moderate severity, only the lower struts will deform or collapse (See FIG. 9). In a more severe crash, both the upper and lower struts will deform and collapse. This action of the struts gradually absorbs energy and thus prevents the forces on the steering column to become great enough to tilt the steering column further in an upward direction.

The resistance of the struts to deformation and/or collapse can be changed by adding or subtracting dents or darts, or increasing or decreasing the depth of the darts, or changing the dimensions or material of the struts.

Figure 1:
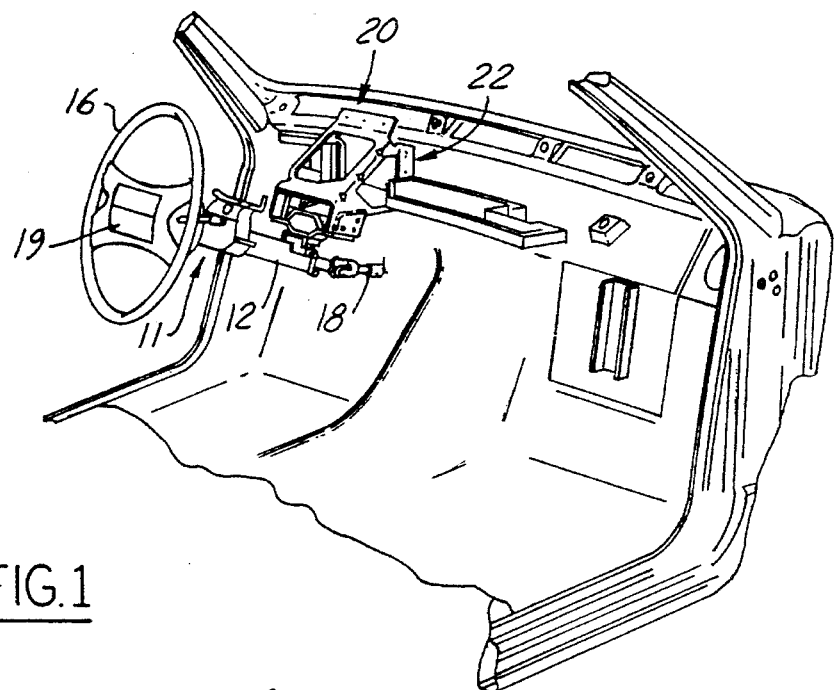
FIG. 1 is a perspective view taken inside an automotive vehicle in which the instrument panel has been removed to show the energy absorbing device of this invention connected to the dash panel of the vehicle and to the steering column.
Figure 4:
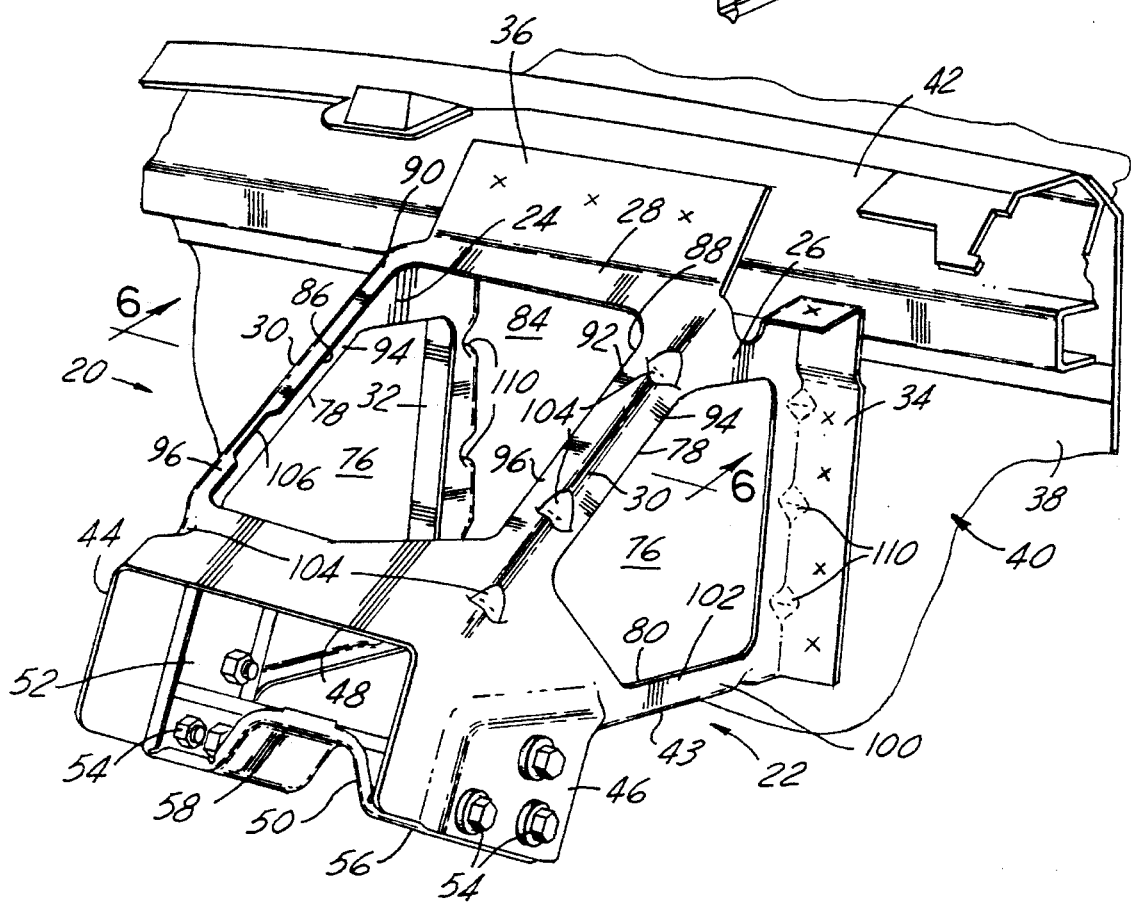
FIG. 4 is a perspective view showing the energy absorbing device attached to the dash panel of the vehicle, with the instrument panel and steering column removed.
Figure 3:
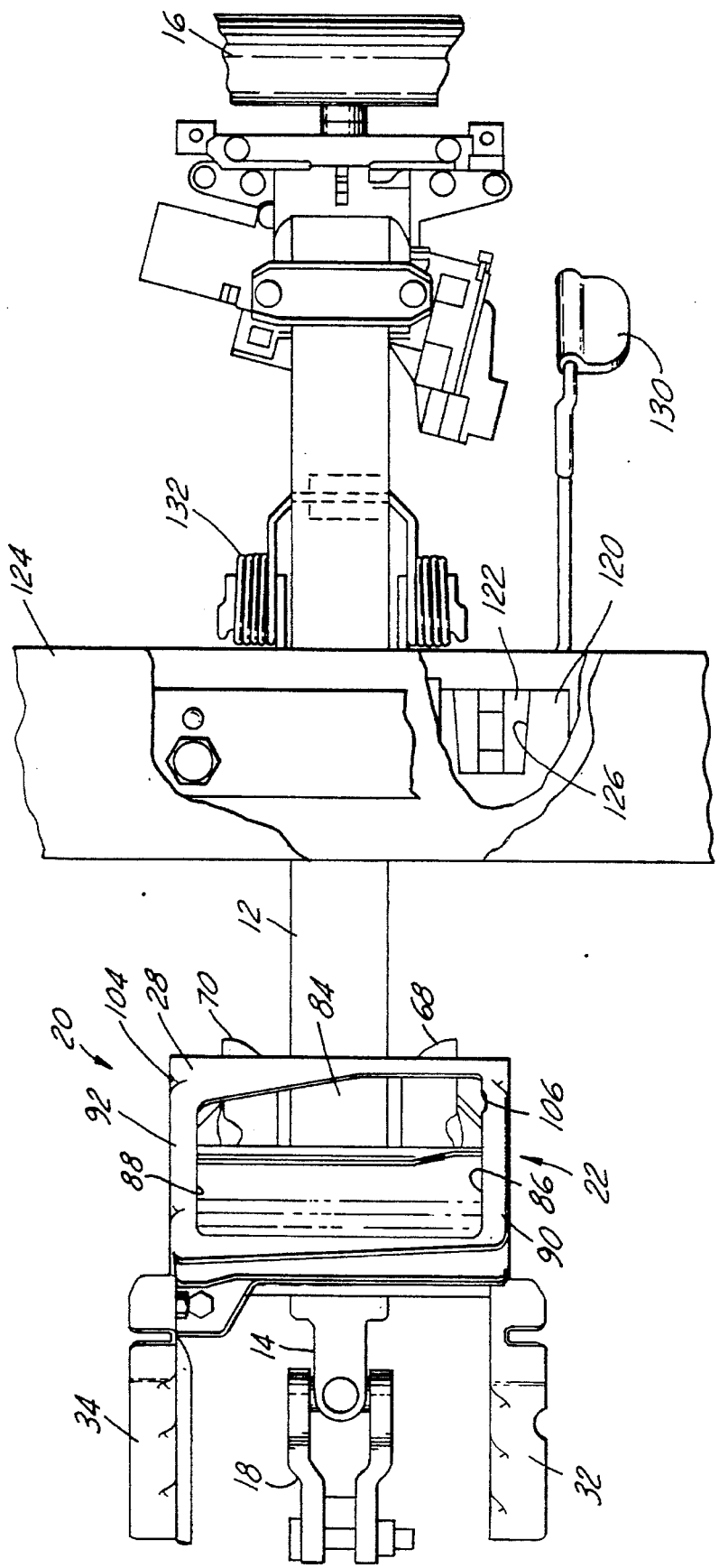
FIG. 3 is a top view of the steering column and energy absorbing device of FIG. 2, with parts broken away.
Figure 8:
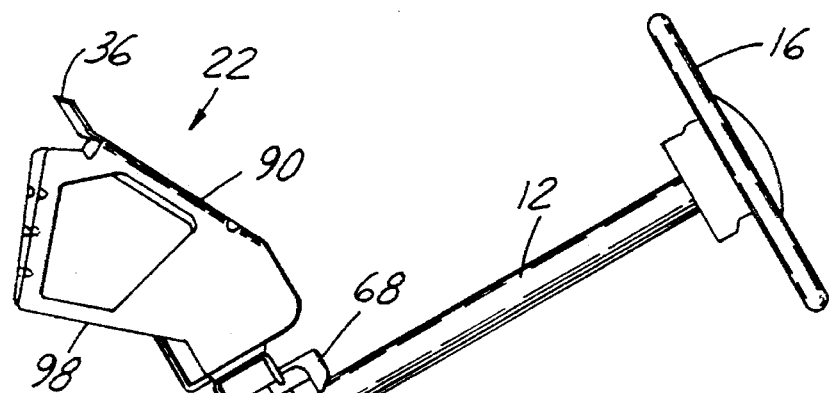
FIGS. 8, 9 and 10 are diagrammatic views showing respectively the steering column before a crash, after deployment of the air bag, and some moments later after the pressure in the air bag has partially dissipated.

As already stated, the air bag in the steering wheel will deploy upon initial impact. The air bag will protect the chest of the driver as the driver moves forward. FIG. 8 is a diagrammatic illustration of the steering column 12 and bracket 22 before impact. Upon initial impact, the air bag AB will deploy as shown in FIG. 9. FIG. 10 shows the air bag some moments after initial impact when the air bag at least partially deflates. The bracket 22 is shown in FIG. 9 with the lower struts deformed or collapsed and in FIG. 10 with the upper and lower struts deformed or collapsed, thus absorbing the displacement caused by the powertrain intrusion into the dash panel, without changing the angle of the steering column.

Darting along the mounting flanges 32 and 34 as indicated at 110 where the mounting flanges connect into the front edges of the side panels also provides for a degree of controlled deformation of the side panels of the bracket in a collision. This further cushions against the impact of the powertrain rearward vehicle portions.

The steering column 12 is secured to the crossmember 120. Slides 122 affixed to the vehicle support structure 124 in a manner not shown engage slots 126 in the crossmember and permit the forward movement of the steering column in the event of a collision. The steering column 12 may be locked in an adjusted, tilted position by a releasable locking device 128 operated by a handle 130. A spring unit 132 urges the steering column upwardly when the looking device is released.

We claim:

1. In an automotive vehicle having an elongated, upwardly and rearwardly angled steering column, an engine forwardly of the steering column, and vehicle support structure;

the improvement comprising an energy absorbing device for cushioning the steering column when the powertrain impacts rearward vehicle portions in a frontal collision, without materially altering the angle of the steering column, said energy absorbing device comprising a bracket adjacent to and above the steering column having a front end portion secured to the vehicle support structure and a rear end portion operatively connected to the steering column, said bracket being in the form of a generally box-shaped frame having laterally spaced apart side panels disposed in vertical planes parallel to the steering column, said side panels having upper and lower edges, and an upper transverse panel provided with side edges forming an integral connection with the upper edges of the side panels, said side panels and transverse panel each having an enlarged central opening therein, said openings defining elongated, parallel lower struts in said side panels adjacent the lower edges thereof and elongated, parallel upper struts along the connection between the side panels and transverse panel, said struts being made of a relatively stiff, bendable, flexible material capable of controlled deformation and collapse caused when the powertrain impacts rearward vehicle portions in a frontal collision, said lower struts being so constructed as to have a lesser resistance to deformation than said upper struts and therefore to collapse more readily than said upper struts when the powertrain impacts rearward vehicle portions, whereby in a frontal collision of moderate severity only the lower struts will collapse whereas in a frontal collision of greater severity the lower struts will collapse first followed by the collapse of the upper struts.

2. The improvement defined in claim 1, wherein each of said struts is formed with one or more flex points to initiate collapse when the powertrain impacts rearward vehicle portions.

3. The improvement defined in claim 2, wherein said upper struts are generally L-shaped, each having a first flange formed from a portion of one of the side panels and a second flange formed from a portion of the transverse panel, said first and second flanges of each upper strut forming an angle of about 90 degrees, and wherein said lower struts are generally L-shaped, each lower strut having a third flange formed from a portion of one of the side panels, each lower strut having a fourth flange extended laterally inwardly from the lower edge of the third flange thereof and forming an angle of about 90 degrees with said third flange.

4. The improvement defined in claim 3, wherein at least some of said flex points are formed by dents extending across the angle formed by the flanges of the struts in which they are formed.

* * * * *